(12) United States Patent
Kaneko et al.

(10) Patent No.: US 8,016,489 B2
(45) Date of Patent: Sep. 13, 2011

(54) SLIDING BEARING

(75) Inventors: Ryohei Kaneko, Kanagawa (JP); Atsushi Yoshida, Kanagawa (JP)

(73) Assignee: Oiles Corporation, Tokyo (JP)

( * ) Notice: Subject to any disclaimer, the term of this patent is extended or adjusted under 35 U.S.C. 154(b) by 384 days.

(21) Appl. No.: 12/299,676

(22) PCT Filed: May 10, 2007

(86) PCT No.: PCT/JP2007/000502
§ 371 (c)(1), (2), (4) Date: Apr. 22, 2009

(87) PCT Pub. No.: WO2007/132557
PCT Pub. Date: Nov. 22, 2007

(65) Prior Publication Data
US 2009/0220179 A1    Sep. 3, 2009

(30) Foreign Application Priority Data

May 15, 2006  (JP) .................. 2006-135299

(51) Int. Cl.
*F16C 33/74* (2006.01)
(52) U.S. Cl. ...................... 384/420; 384/147
(58) Field of Classification Search .............. 384/147, 384/420, 607
See application file for complete search history.

(56) References Cited

U.S. PATENT DOCUMENTS

| | | | | |
|---|---|---|---|---|
| 4,969,752 A | * | 11/1990 | Kubota et al. | 384/420 |
| 6,918,701 B2 | * | 7/2005 | Ueno et al. | 384/420 |
| 2004/0240761 A1 | * | 12/2004 | Watai et al. | 384/420 |
| 2009/0180719 A1 | * | 7/2009 | Miyata et al. | 384/147 |

FOREIGN PATENT DOCUMENTS

| | | |
|---|---|---|
| GB | 1 537 213 | 12/1978 |
| JP | 52-134963 A | 11/1977 |
| JP | 9-144890 A | 6/1997 |
| JP | 2001-27227 A | 1/2001 |
| JP | 2001-27229 A | 1/2001 |

OTHER PUBLICATIONS

Microfilm of the specification and drawings annexed to the request of Japanese Utility Model Application No. 116481/1988 (Laid Open No. 38568/1990) (Arai Seisakusho Co., Ltd.), Mar. 14, 1990, p. 3, line 19 to pay 4, line 12; Fig. 1.
International Search Report for PCT/JP2007/000502, mailed Jun. 5, 2007.

* cited by examiner

*Primary Examiner* — Thomas R Hannon
(74) *Attorney, Agent, or Firm* — Nixon & Vanderhye P.C.

(57) ABSTRACT

A sliding bearing 1 includes an upper casing 3 having an annular lower surface 2; a lower casing 5 which is superposed on the upper casing 3 so as to be rotatable about an axis O of the upper casing 3 and has an annular upper surface 4 opposed to the annular lower surface 2; an annular thrust sliding bearing piece 6 disposed in an annular space 36 between the annular lower surface 2 and the annular upper surface 4; and a seal means 38 disposed on an outer peripheral side of the annular space 36.

11 Claims, 11 Drawing Sheets

SLIDING BEARING

This application is the U.S. national phase of International Application No. PCT/JP2007/000502, filed 10 May 2007, which designated the U.S. and claims priority to Japanese Application No. 2006-135299, filed 15 May 2006, the entire contents of each of which are hereby incorporated by reference.

TECHNICAL FIELD

The present invention relates to a sliding bearing, and more particularly to a sliding bearing which is suitably incorporated as a thrust sliding bearing of a strut-type suspension (Macpherson type) in a four-wheeled vehicle.

BACKGROUND ART

Patent document 1: JP-A-7-301226
Patent document 2: JP-A-8-4754
Patent document 3: JP-A-11-13767

In patent documents 1 to 3, for example, sliding bearings are proposed which are each comprised of an upper casing, a lower casing, and a thrust sliding bearing piece interposed between the upper and lower casings, wherein an annular space in which the thrust sliding bearing piece is interposed is sealed by labyrinth action. In addition, Patent document 3 proposes a sliding bearing which has an annular body constituted by a plate-like ring made of a metal and disposed by being relatively slidably supported by the upper and lower casings, so as to close the outer peripheral side of the annular space between the upper and lower casings.

DISCLOSURE OF THE INVENTION

Problems to be Solved by the Invention

Meanwhile, with such a sliding bearing, in a case where a seal portion having a labyrinth structure as proposed in patent documents 1 to 3 is used, since the structure is not such as to completely seal the annular space between the upper and lower casings, the sliding bearing tends to be inferior in sealability for preventing the entry of dust, rainwater, muddy water, or the like into the annular space.

In addition, in such a sliding bearing, in the case where the annular body is used as shown in Patent document 3, an increase in the sliding frictional resistance between the upper casing and the lower casing can result, so that it is difficult to maintain high sealability for extended periods of time, and there is a possibility that unpleasant noise due to the sliding friction between the upper casing and the lower casing becomes large.

The present invention has been devised in view of the above-described aspects, and its object is to provide a sliding bearing which is capable of exhibiting high sealability and attaining the maintenance of high sealability over extended periods of time and reduction of unpleasant noise.

Means for Solving the Problems

A sliding bearing in accordance with the invention comprises: an upper casing having an annular lower surface; a lower casing which is superposed on the upper casing so as to be rotatable about an axis of the upper casing and has an annular upper surface opposed to the annular lower surface of the upper casing; an annular thrust sliding bearing piece disposed in an annular space between the annular lower surface and the annular upper surface; and seal means disposed on at least one of an outer peripheral side and an inner peripheral side of the annular space, wherein the seal means includes a plurality of through holes formed in at least one of an outer peripheral side and an inner peripheral side of the lower casing, an annular fitting portion which is inserted into the plurality of through holes so as to be fitted to the lower casing, and a flexible thin-walled annular projecting edge portion which is formed on the annular fitting portion and is brought into sliding contact with the upper casing so as to seal at least one of the outer peripheral side and the inner peripheral side of the annular space.

According to the sliding bearing of the invention, in particular, the seal means includes a plurality of through holes formed in at least one of the outer peripheral side and the inner peripheral side of the lower casing; an annular fitting portion which is inserted into the plurality of through holes so as to be fitted to the lower casing; and a flexible thin-walled annular projecting edge portion which is formed on the annular fitting portion and is brought into sliding contact with the upper casing so as to seal at least one of the outer peripheral side and the inner peripheral side of the annular space. Therefore, it is possible to eliminate the possibility of separation of the annular fitting portion from the lower casing, prevent the occurrence of rotation of the annular fitting portion with respect to the lower casing, and reduce a contacting region of the seal means with respect to the upper casing. Hence, it is possible to exhibit high sealability due to the sliding contact of the flexible thin-walled annular projecting edge portion with respect to the upper casing. Additionally, it is possible to attain the maintenance of such high sealability over extended periods of time and reduction of unpleasant noise. In particular, since the annular fitting portion is inserted into the plurality of through holes so as to be fitted to the lower casing, it is possible to eliminate the twisting of the annular fitting portion and the thin-walled annular projecting edge portion, which can occur due to the relative rotation between the upper casing and the lower casing. Hence, it is possible to prevent with higher sealability the entry of dust, rainwater, muddy water, or the like into the annular space through the portion between the annular fitting portion and the lower casing.

In a preferred example of the sliding bearing of the invention, the lower casing includes a lower annular plate portion having the annular upper surface and an annular projection which is formed integrally with at least one of an outer peripheral surface and an inner peripheral surface of the lower annular plate portion, and which is thinner-walled than the lower annular plate portion, the plurality of through holes being formed in the annular projection, the annular fitting portion being inserted into the plurality of through holes to cover the annular projection. According to such a preferred example, the annular fitting portion can be fitted to the lower casing more reliably.

In still another preferred example of the sliding bearing of the invention, the annular fitting portion may include a hollow cylindrical portion; an upper annular portion and a lower annular portion formed integrally with the hollow cylindrical portion; and a plurality of connecting portions which are respectively inserted into the plurality of through holes so as to connect the upper annular portion and the lower annular portion.

In a further preferred example of the sliding bearing of the invention, the annular fitting portion may have a cross-sectionally L-shaped portion which is inserted into the plurality of through holes so as to be secured to the lower casing.

In a further preferred example of the sliding bearing of the invention, in a case where there is provided the seal means disposed on the outer peripheral side of the annular space, the upper casing includes an upper annular plate portion having the annular lower surface and an upper outer cylindrical portion formed on an outer peripheral surface side of the upper annular plate portion, and the thin-walled annular projecting edge portion of the seal means is inclined in such a manner as to be gradually removed away from the upper annular plate portion as the thin-walled annular projecting edge portion approaches the upper outer cylindrical portion. According to such a preferred example, high sealability can be exhibited, and the maintenance of high sealability over extended periods of time can also be attained.

In a further preferred example of the sliding bearing of the invention, an inner peripheral surface of the upper outer cylindrical portion has a portion which is gradually enlarged in diameter with increasing distance from the upper annular plate portion, and an outside diameter of the thin-walled annular projecting edge portion of the seal means disposed on the outer peripheral side of the annular space is larger than or equal to a maximum diameter of the inner peripheral surface of the upper outer cylindrical portion. According to such a preferred example, it is possible to eliminate the possibility of the thin-walled annular projecting edge portion being removed away from the upper outer cylindrical portion, thereby allowing high sealability to be exhibited.

In a further preferred example of the sliding bearing of the invention, in a case where there is provided the seal means disposed on the inner peripheral side of the annular space, the upper casing includes an upper annular plate portion having the annular lower surface and an upper inner cylindrical portion formed on an inner peripheral surface side of the upper annular plate portion, and the thin-walled annular projecting edge portion of the seal means is inclined in such a manner as to be gradually removed away from the upper annular plate portion as the thin-walled annular projecting edge portion approaches the upper inner cylindrical portion. According to such a preferred example, high sealability can be exhibited, and the maintenance of high sealability over extended periods of time can also be attained.

In a further preferred example of the sliding bearing of the invention, an outer peripheral surface of the upper inner cylindrical portion has a portion which is gradually reduced in diameter with increasing distance from the upper annular plate portion, and an inside diameter of the thin-walled annular projecting edge portion of the seal means disposed on the inner peripheral side of the annular space is smaller than or equal to a minimum diameter of the outer peripheral surface of the upper inner cylindrical portion. According to such a preferred example, it is possible to eliminate the possibility of the thin-walled annular projecting edge portion being removed away from the upper inner cylindrical portion, thereby allowing high sealability to be exhibited.

In a further preferred example of the sliding bearing of the invention, the thin-walled annular projecting edge portion is formed of a thermoplastic elastomer.

In a further preferred example of the sliding bearing of the invention, at least one of the upper casing and the lower casing is formed of a synthetic resin, and the synthetic resin for forming at least one of the upper casing and the lower casing includes at least one of polyacetal resin, polyamide resin, polyester resin, polyolefin resin, polycarbonate resin, and fluororesin.

In a further preferred example of the sliding bearing of the invention, the thrust sliding bearing piece is formed of a synthetic resin, and the synthetic resin for forming the thrust sliding bearing piece includes at least one of polyacetal resin, polyamide resin, polyester resin, polyolefin resin, polycarbonate resin, and fluororesin.

ADVANTAGES OF THE INVENTION

According to the invention, it is possible to provide a sliding bearing which is capable of exhibiting high sealability and attaining the maintenance of high sealability over extended periods of time and reduction of unpleasant noise.

Hereafter, a more detailed description will be given of the embodiments of the invention on the basis of the embodiments shown in the drawings. It should be noted that the present invention is not limited to these embodiments.

BEST MODE FOR CARRYING OUT THE INVENTION

In FIGS. 1 to 9, a sliding bearing 1 of this embodiment includes an upper casing 3 having an annular lower surface 2; a lower casing 5 which is superposed on the upper casing 3 so as to be rotatable about an axis O of the upper casing 3 and has an annular upper surface 4 opposed to the annular lower surface 2; an annular thrust sliding bearing piece 6 disposed in an annular space 36 between the annular lower surface 2 and the annular upper surface 4; and a seal means 38 disposed on an outer peripheral side of the annular space 36.

Figure 1:
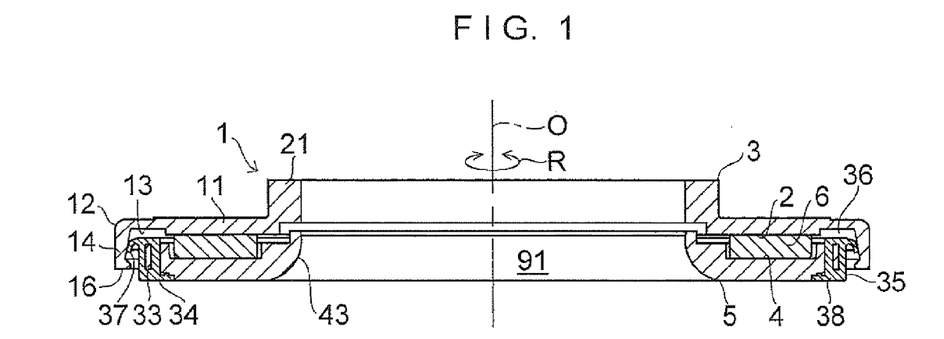
FIG. 1 is an explanatory cross-sectional view of an embodiment of the invention.
Figure 2:
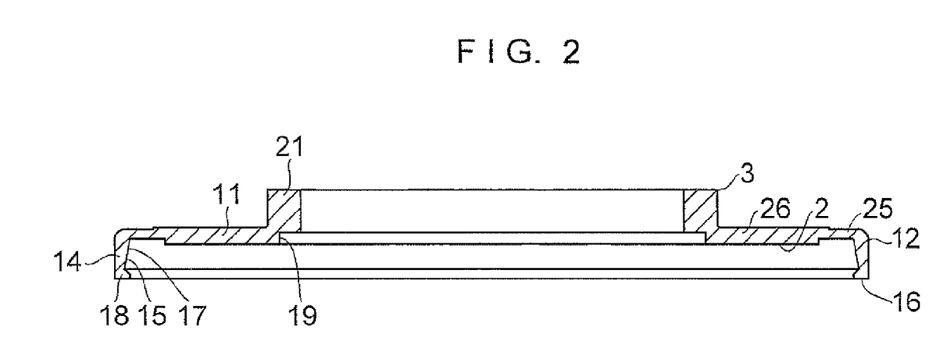
FIG. 2 is an explanatory cross-sectional view of mainly an upper casing of the embodiment shown in FIG. 1.

As shown in FIGS. 1 and 2, the upper casing 3 includes a circular ring-shaped upper annular plate portion 11 having the aforementioned annular lower surface 2; a hollow cylindrical, large-diameter upper outer cylindrical portion 14 formed integrally with an outer peripheral surface 12 side of the upper annular plate portion 11 and extending downward; a circular ring-shaped annular enlarged portion 18 formed integrally with the portion of an inner peripheral surface 15 of a lower surface 16 side of the upper outer cylindrical portion 14; and a hollow cylindrical, small-diameter upper inner cylindrical portion 21 formed integrally with the portion of an inner peripheral surface 19 side of the upper annular plate portion 11 and extending upward.

The upper annular plate portion 11 has an outer thin-walled portion 25 and an inner thick-walled portion 26 formed integrally with the outer thin-walled portion 25. The upper outer cylindrical portion 14 is formed at the portion of the outer peripheral surface 12 side of the outer thin-walled portion 25. The upper inner cylindrical portion 21 is formed integrally with the portion of the inner peripheral surface 19 side of the inner thick-walled portion 26. A lower surface of the inner thick-walled portion 26 in a lower surface 13 of the upper annular plate portion 11 is constituted by the annular lower surface 2.

The inner peripheral surface 15 of the upper outer cylindrical portion 14 has a portion whose diameter becomes larger with increasing distance from the upper annular plate portion 11. In this embodiment, a portion 17 of the inner peripheral surface 15 from the upper annular plate portion 11 to the annular enlarged portion 18 is gradually enlarged in diameter from the upper annular plate portion 11 toward the annular enlarged portion 18.

The annular enlarged portion 18 is formed in such a manner as to bulge from the outer peripheral side of the upper casing 3 toward the inner peripheral side thereof in the radial direction. Since the annular enlarged portion 18 is thus formed, the annular enlarged portion 18 has a portion which is gradually reduced in diameter from the upper annular plate portion 11 toward the lower side.

As shown in FIGS. 1 and 3 to 9, the lower casing 5 includes a lower annular plate portion 31 having the aforementioned annular upper surface 4, as well as an outer peripheral-side annular projection 33 serving as an annular projection which is formed integrally with an outer peripheral surface 32 of the lower annular plate portion 31, and which is thinner-walled than that lower annular plate portion 31.

Figure 3:
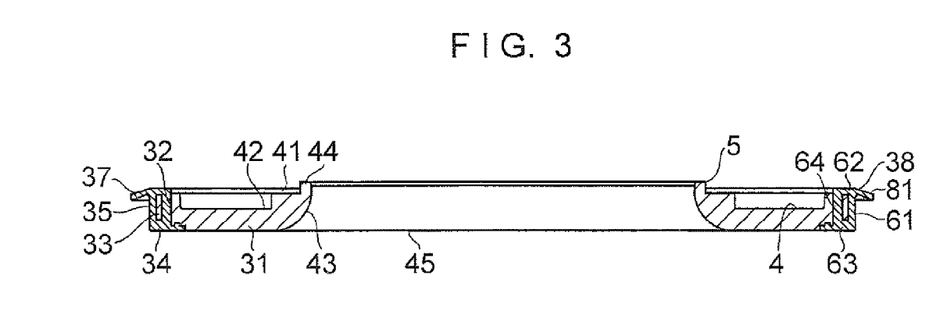
FIG. 3 is an explanatory cross-sectional view of mainly a lower casing of the embodiment shown in FIG. 1.
Figure 4:
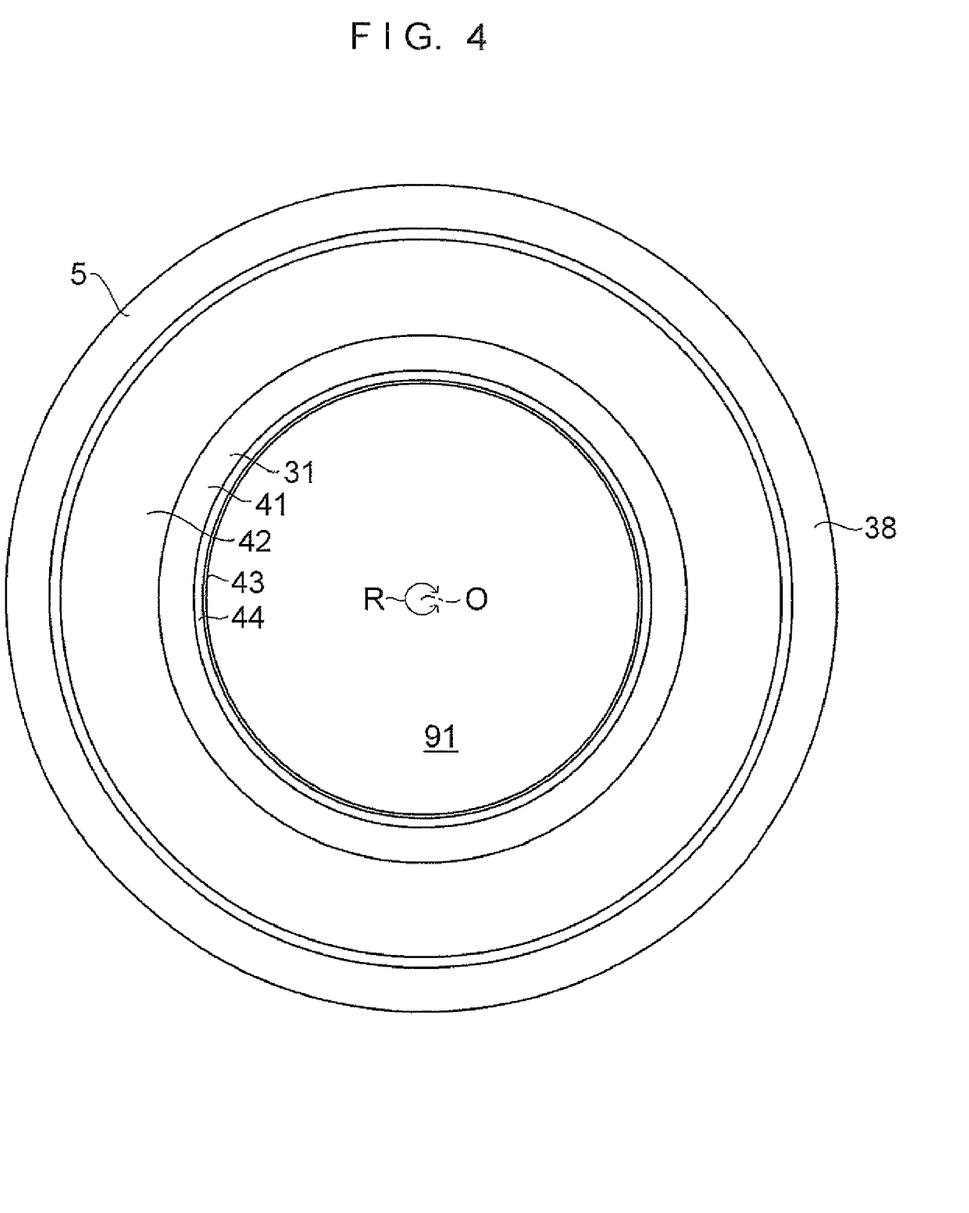
FIG. 4 is an explanatory plan view of mainly the lower casing of the embodiment shown in FIG. 1.
Figure 5:
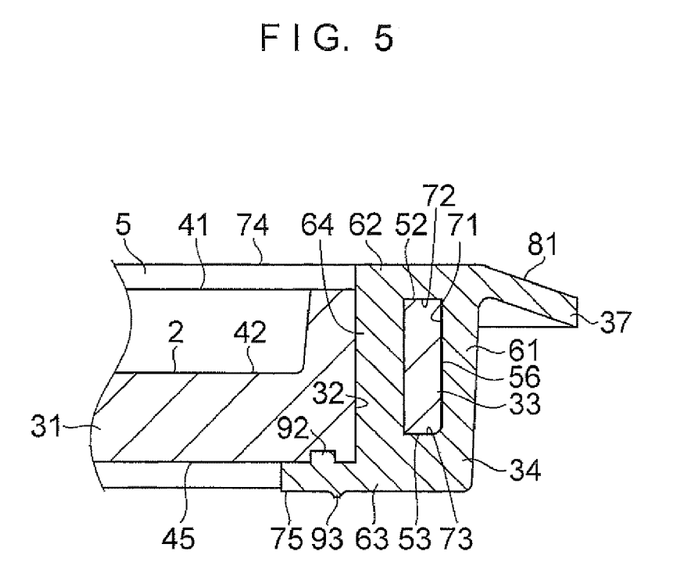
FIG. 5 is a partly enlarged explanatory diagram of mainly the lower casing of the embodiment shown in FIG. 1.
Figure 6:
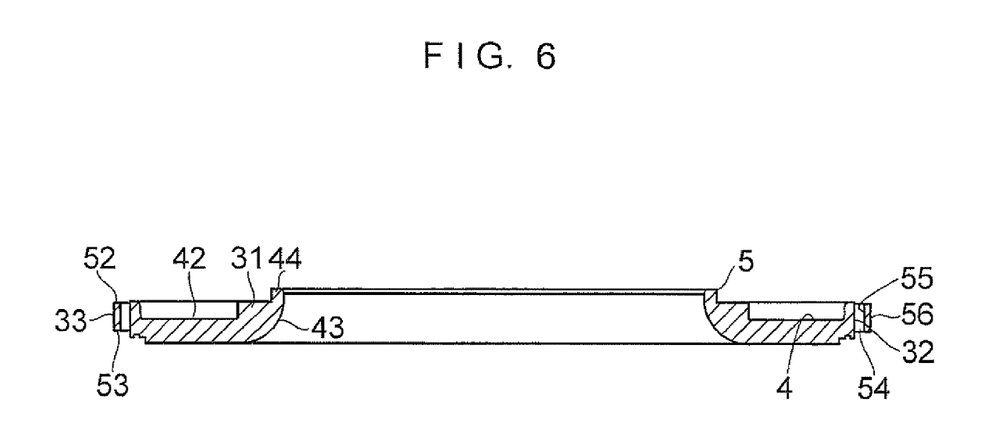
FIG. 6 is a fragmentary explanatory cross-sectional view of mainly the lower casing of the embodiment shown in FIG. 1.
Figure 7:
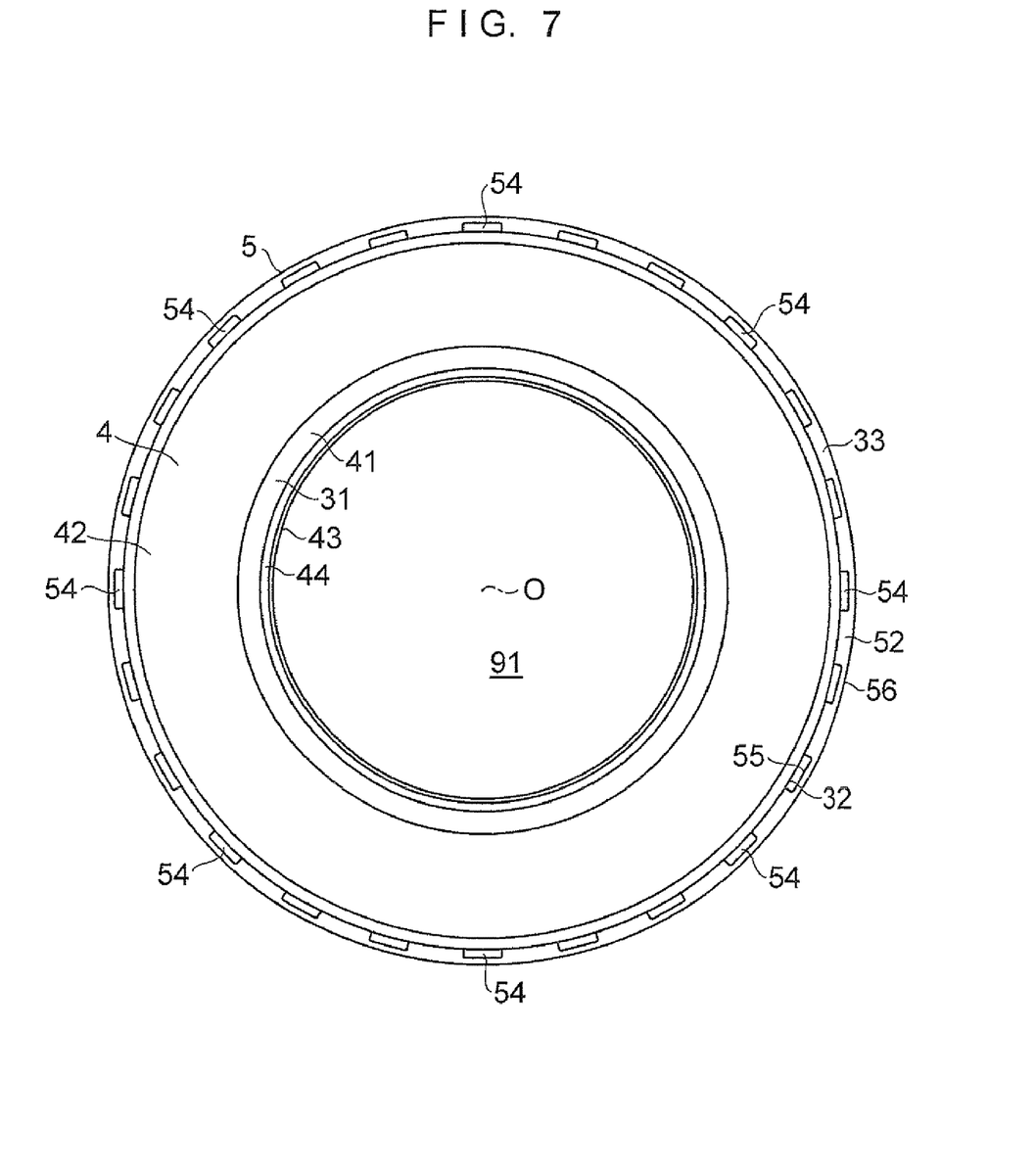
FIG. 7 is a fragmentary explanatory plan view of mainly the lower casing of the embodiment shown in FIG. 1.
Figure 8:
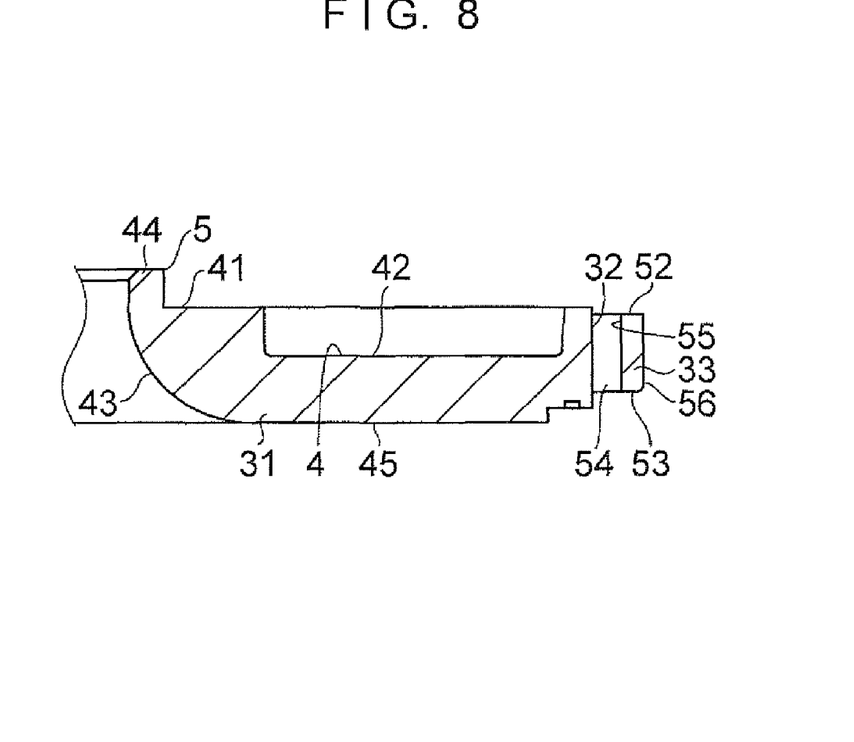
FIG. 8 is a partly enlarged explanatory diagram of mainly the lower casing of the embodiment show in FIG. 1.
Figure 9:
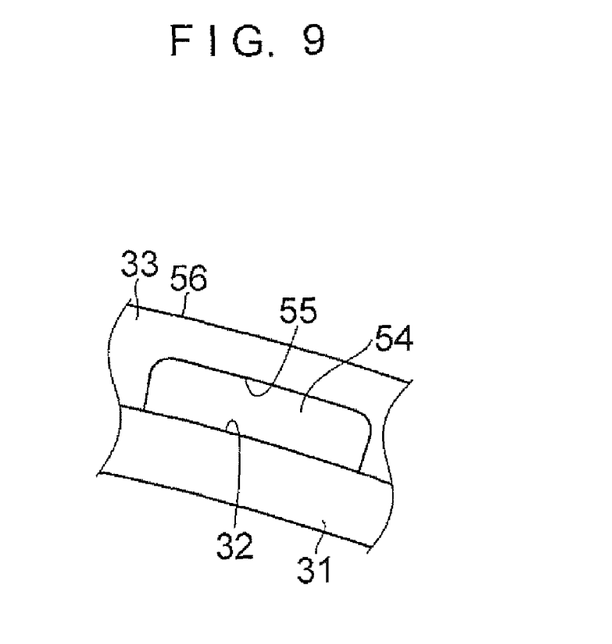
FIG. 9 is a partly enlarged explanatory diagram of mainly the lower casing of the embodiment shown in FIG. 1.

A circular ring-shaped annular indented portion 42 is formed on an upper surface 41 of the lower annular plate portion 31. The bottom surface of the annular indented portion 42 is constituted by the annular upper surface 4 opposed to the annular lower surface 2. The thrust sliding bearing piece 6 is adapted to be disposed on the annular indented portion 42. A lower cylindrical portion 44 having an inside diameter equal to the inside diameter of the upper inner cylindrical portion 21 is formed integrally with the upper surface 41 on an inner peripheral surface 43 side of the lower annular plate portion 31. The thrust sliding bearing piece 6 at its upper and lower surfaces is in slidable contact with the annular lower surface 2 and the annular upper surface 4.

The inner peripheral surface 43 of the lower annular plate portion 31 is enlarged in diameter with a fixed curvature from the upper surface 41 of the lower annular plate portion 31 toward a lower surface 45 thereof in this embodiment.

Each of the annular lower surface 2 and the annular upper surface 4, as well as the upper and lower surfaces of the thrust sliding bearing piece 6, may be provided with a groove for accommodating grease (lubricant).

The outer peripheral-side annular projection 33 at its inner peripheral surface is formed integrally with the outer peripheral surface 32 of the lower annular plate portion 31. Grooves 55 for defining a plurality of through holes 54 of the seal means 38 are formed in the inner peripheral surface of the outer peripheral-side annular projection 33. An outer peripheral surface 56 of the outer peripheral-side annular projection 33 is opposed to the inner peripheral surface 15 of the upper outer cylindrical portion 14 with a gap where the seal means 38 is disposed with respect to that inner peripheral surface 15.

The seal means 38 includes the plurality of through holes 54 formed on an outer peripheral side of the lower casing 5; an outer peripheral-side annular fitting portion 34 serving as an annular fitting portion which is inserted into the plurality of through holes 54 so as to be fitted to the lower casing 3; and a flexible outer peripheral-side thin-walled annular projecting edge portion 37 which is formed integrally with the outer peripheral-side annular fitting portion 34, and is brought into sliding contact with the upper casing 3 so as to seal the outer peripheral side of the annular space 36. It should be noted that the annular space 36 in this embodiment is adapted to be defined by the seal means 38 and a shaft (not shown) such as a piston rod inserted into a central hole 91, but the annular space 36 may be defined by the seal means 38 and a seal means disposed on the inner peripheral side of the sliding bearing 1.

As for the through holes 54, in this embodiment, 24 through holes are respectively arranged in the outer peripheral-side annular projection 33 at mutually equal intervals in the circumferential direction. Each of the through holes 54 is defined by the surface of the groove 55, which is U-shaped in a plan view, of the outer peripheral-side annular projection 33 and by the outer peripheral surface 32 of the lower annular plate portion 31. Each of the through holes 54 extends from an upper surface 52 to a lower surface 53 of the outer peripheral-side annular projection 33. The lower surface 53 is disposed on a side closer to the upper surfaces 41 and 52 than the lower surface 45. It should be noted that the upper surface 52 and the upper surface 41 may be flush with each other.

As a material for forming the outer peripheral-side annular fitting portion 34 and the outer peripheral-side thin-walled annular projecting edge portion 37, it is possible to use either a crosslinked rubber or a thermoplastic elastomer, but it is preferable to use a thermoplastic elastomer. As specific examples of the thermoplastic elastomer, it is possible to cite polyester elastomer, polyurethane elastomer, polyolefin elastomer, silicone elastomer, and the like.

The outer peripheral-side annular fitting portion 34 includes a hollow cylindrical portion 61; an upper annular portion 62 and a lower annular portion 63 formed integrally with the hollow cylindrical portion 61 and a plurality of connecting portions 64 which are disposed on a side closer to the lower annular plate portion 31 than the hollow cylindrical portion 61 and are inserted into the respective through holes 54 so as to connect the upper annular portion 62 and the lower annular portion 63. The upper annular portion 62 is formed integrally with an upper end of the hollow cylindrical portion 61 and extends from the hollow cylindrical portion 61 toward the lower annular plate portion 31. The lower annular portion 63 is formed integrally with a lower end of the hollow cylindrical portion 61 and extends toward the lower annular plate portion 31. The lower annular portion 63 has a thickness greater than that of the upper annular portion 62. The lower annular portion 63 extends from the hollow cylindrical portion 61 to the lower surface 45 on the outer peripheral surface 32 side of the lower annular plate portion 31. An annular protrusion 92, which is fitted into an annular recess formed in the lower surface 45 of the outer peripheral surface 32 side of the lower annular plate portion 31, is formed on an upper surface 73 of the lower annular portion 63. An annular projection 93 is provided on a lower surface 75 of the lower annular portion 63 in such a manner as to project downward toward a mating member such as a spring receiving member abutting against that lower surface 75. The annular projection 93 is disposed below the lower surface 45 on the outer peripheral surface 32 side of the lower annular plate portion 31. The outer peripheral-side annular fitting portion 34 is inserted into the respective through holes 54 and is thereby fitted to the outer peripheral-side annular projection 33 in such a manner as to cover that outer peripheral-side annular projection 33.

An inner peripheral surface 71 of the hollow cylindrical portion 61 is in contact with an outer peripheral surface 56 of the outer peripheral-side annular projection 33, an annular lower surface 72 of the upper annular portion 62 is in contact with the upper surface 52 of the outer peripheral-side annular projection 33, and the upper surface 73 of the lower annular portion 63 is in contact with the lower surface 53 of the outer peripheral-side annular projection 33. An upper surface 74 of the upper annular portion 62 is located on a side closer to the upper annular plate portion 11 than the upper surface 41. The inner peripheral-side portion of the lower annular portion 63 may be disposed on, for example, an annular stepped portion formed on the outer peripheral side of the lower annular plate portion 31. In such a case, the lower surface 75 of the lower annular portion 63 may be flush with the lower surface 45. The inner peripheral surface 71 of the hollow cylindrical portion 61, the lower surface 72 of the upper annular portion 62, and the upper surface 73 of the lower annular portion 63 may be adhered to the outer peripheral surface 56, the upper surface 52, and the lower surface 53 of the outer peripheral-side annular projection 33.

The connecting portions 64 are respectively provided in a number, at positions, and with a shape corresponding to the number, positions, and shape of the through holes 54 in this embodiment. An upper end of the connecting portion 64 is formed integrally with the lower surface 72 of the upper annular portion 62, while a lower end of the connecting portion 64 is formed integrally with the upper surface 73 of the lower annular portion 63.

The outer peripheral-side thin-walled annular projecting edge portion 37 is formed integrally with the outer peripheral surface 35 of the outer peripheral-side annular fitting portion 34 and is adapted to be brought into sliding contact with the inner peripheral surface 15 of the upper outer cylindrical portion 14 so as to seal the outer peripheral side of the annular space 36 between the upper casing 3 and the lower casing 5 where the thrust sliding bearing piece 6 is disposed. The outer peripheral-side thin-walled annular projecting edge portion 37 in this example has a thickness equal to that of the upper annular portion 62. The outer peripheral-side thin-walled annular projecting edge portion 37 is inclined in such a manner as to be gradually removed away from the upper annular plate portion 11 as the outer peripheral-side thin-walled annular projecting edge portion 37 approaches the upper outer cylindrical portion 14. An outside diameter of the outer peripheral-side thin-walled annular projecting edge portion 37 is larger than or equal to the maximum diameter of the inner peripheral surface 15 of the upper outer cylindrical portion 14. When the lower casing 5 is pushed inside of the upper outer cylindrical portion 14 of the upper casing 3 and is disposed within that upper outer cylindrical portion 14, the outer peripheral-side thin-walled annular projecting edge portion 37 is flexed while being brought into sliding contact with the inner peripheral surface 15, and is brought into sliding contact with the inner peripheral surface 15 solely at an upper surface 81 of the outer peripheral-side thin-walled annular projecting edge portion 37, as shown in FIG. 1.

The upper casing 3, the lower casing 5, and the thrust sliding bearing piece 6 are preferably formed of synthetic resin, and the synthetic resin for forming the thrust sliding bearing piece 6 should preferably have self-lubricity, in particular, while the synthetic resin for forming the upper casing 3 and the lower casing 5 should preferably excel in mechanical properties, such as wear resistance, shock resistance, creep resistance, and rigidity. Specifically, the synthetic resin for forming the thrust sliding bearing piece 6 includes at least one of polyacetal resin, polyamide resin, polyester resin such as polybutylene terephthalate resin, polyolefin resin such as polyethylene resin and polypropylene resin, polycarbonate resin, and fluororesin. As the synthetic resin for forming the upper casing 3 and the lower casing 5, a synthetic resin similar to the synthetic resin for forming the thrust sliding bearing piece 6 can be used. However, a synthetic resin which exhibits a good frictional property in combination with the synthetic resin for forming the thrust sliding bearing piece 6 and which has relatively high rigidity is particularly preferable. To illustrate its preferable combinations, for the thrust sliding bearing piece 6 and, the upper casing 3 and the lower casing 5, it is possible to cite a combination of polyacetal resin and polyamide resin, a combination of polyethylene resin and polyacetal resin, a combination of polybutylene terephthalate resin and polyacetal resin, and a combination of polyacetal resin and polyacetal resin. A more preferable combination is that of polyethylene resin and polyacetal resin.

The above-described sliding bearing 1 is used by being installed between, for example, an upper spring seat of a coil spring in a strut-type suspension assembly and a mounting member on the vehicle body side to which a piston rod of a hydraulic damper is secured. In this case, an upper portion of the piston rod is inserted into the central hole 91 of the sliding bearing 1 so as to be rotatable about the axis O in the R direction with respect to the upper casing 3 and the lower casing 5. In the strut-type suspension assembly assembled by means of the sliding bearing 1, at the time of the steering operation, the relative rotation of the upper spring seat about the axis O in the R direction by means of the coil spring is effected by the relative rotation of the lower casing 5 in the same direction with respect to the upper casing 3.

As shown in FIGS. 10 to 16, the sliding bearing 1 in accordance with this embodiment may further include, in addition to the above-described configuration, a seal means 138 disposed on the inner peripheral side of the annular space 36. In such a sliding bearing 1, the lower casing 5 has an inner peripheral-side annular projection 133 serving as an annular projection which is formed integrally with the inner peripheral side of the lower annular plate portion 31 and is thinner-walled than that lower annular plate portion 31, and the upper inner cylindrical portion 21 has a hollow cylindrical thin-walled portion 121 extending downward from its lower surface toward the lower casing 5.

Figure 10:
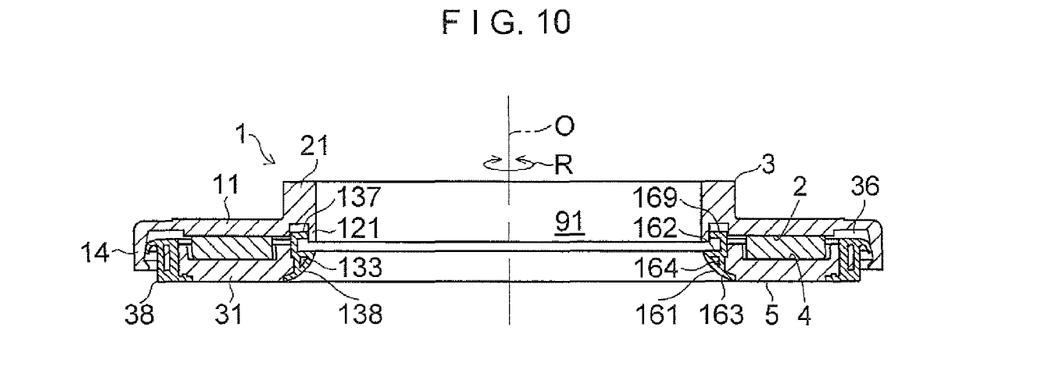
FIG. 10 is an explanatory cross-sectional view of another embodiment of the invention.
Figure 11:
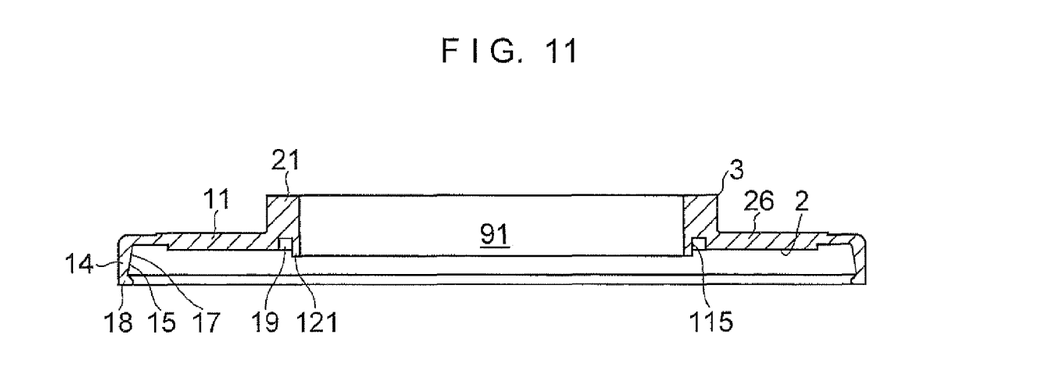
FIG. 11 is an explanatory cross-sectional view of mainly the upper casing of the embodiment shown in FIG. 10.
Figure 12:
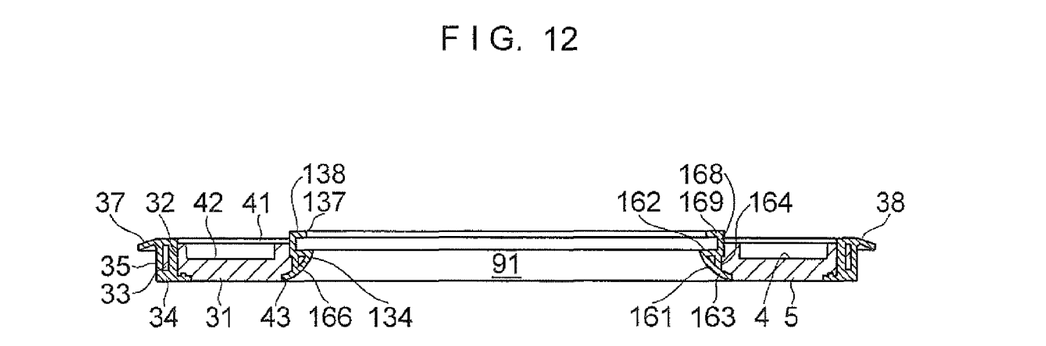
FIG. 12 is an explanatory cross-sectional view of mainly the lower casing of the embodiment shown in FIG. 10.
Figure 13:
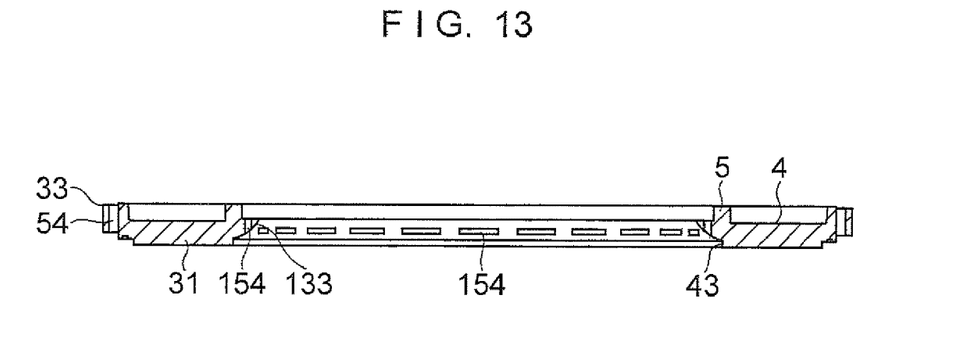
FIG. 13 is a fragmentary explanatory cross-sectional view of mainly the lower casing of the embodiment shown in FIG. 10.
Figure 14:
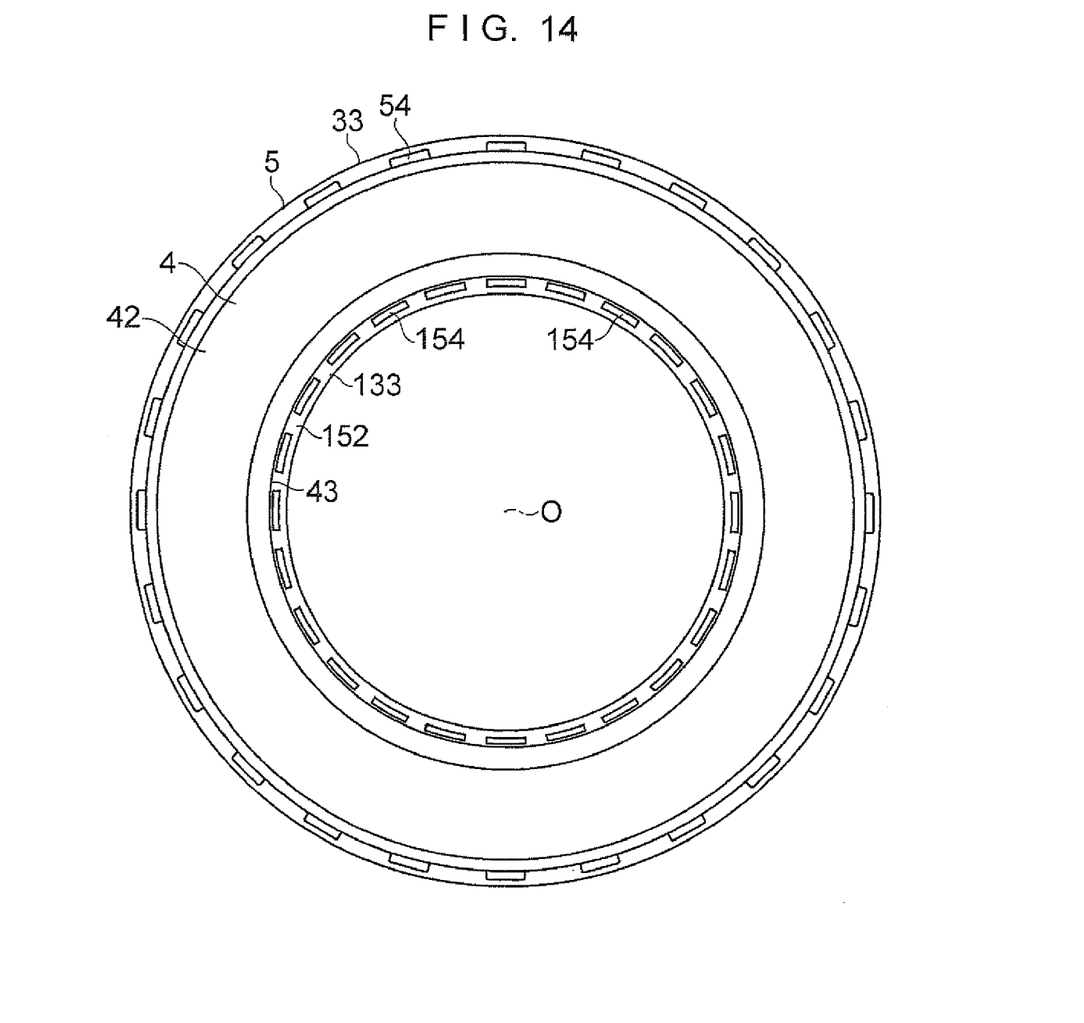
FIG. 14 is a fragmentary explanatory plan view of mainly the lower casing of the embodiment shown in FIG. 10.
Figure 15:
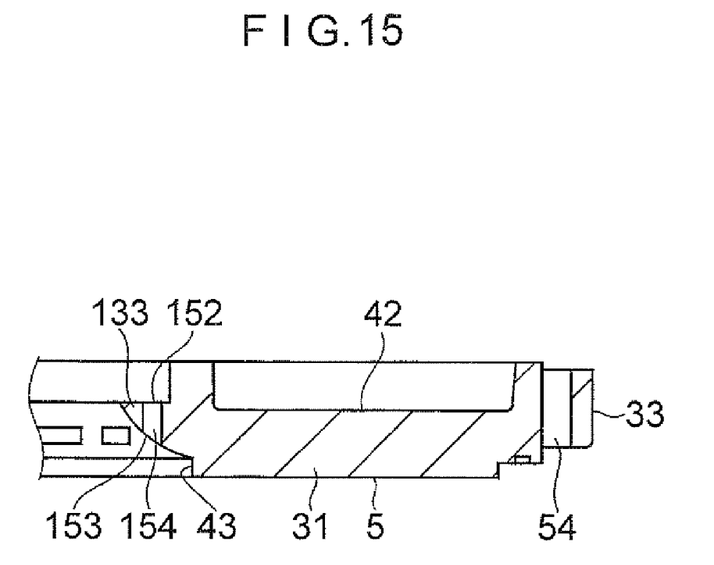
FIG. 15 is a partly enlarged explanatory diagram of mainly the lower casing of the embodiment shown in FIG. 10.
Figure 16:
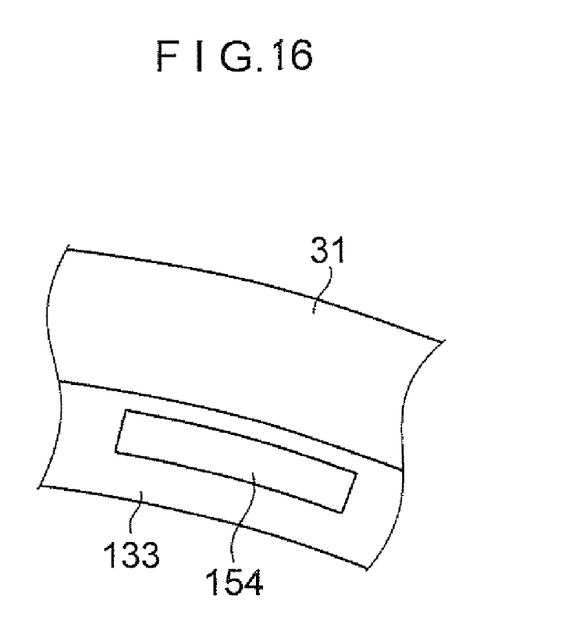
FIG. 16 is a partly enlarged explanatory diagram of mainly the lower casing of the embodiment shown in FIG. 10.

The seal means 138 includes a plurality of through holes 154 formed on the inner peripheral side of the lower casing 5; an inner peripheral-side annular fitting portion 134 serving as an annular fitting portion which is inserted into the plurality of through holes 154 so as to be fitted to the lower casing 5; and an inner peripheral-side thin-walled annular projecting edge portion 137 serving as a flexible thin-walled annular projecting edge portion which is formed on the inner peripheral-side annular fitting portion 134, and is brought into sliding contact with the upper casing 3 so as to seal the inner peripheral side of the annular space 36.

The inner peripheral-side annular fitting portion 134 and the inner peripheral-side thin-walled annular projecting edge portion 137 may be formed of the same material as that of the outer peripheral-side annular fitting portion 34 and the outer peripheral-side thin-walled annular projecting edge portion 37.

The inner peripheral-side annular projection 133 at its outer peripheral surface is formed integrally with the inner peripheral surface 43 of the lower annular plate portion 31. The plurality of through holes 154 are formed in the inner peripheral-side annular projection 133.

Each of the through holes 154 extends from an upper surface 152 to a lower surface 153 of the inner peripheral-side annular projection 133. The plurality of through holes 154 are respectively arranged at mutually equal intervals in the circumferential direction.

The inner peripheral-side annular fitting portion 134 includes a curved hollow cylindrical portion 161 whose diameter becomes larger with increasing distance from the upper casing 3 toward the lower side; an upper annular portion 162 and a lower annular portion 163 formed integrally with the hollow cylindrical portion 161; and a plurality of connecting portions 164 which are inserted into the respective through holes 154 so as to connect the upper annular portion 162 and the lower annular portion 163. The upper annular portion 162 is formed integrally with an upper end of the hollow cylindrical portion 161 and extends from the hollow cylindrical portion 161 toward the inner peripheral surface 43 of the lower annular plate portion 31. The lower annular portion 163 is formed integrally with a lower end of the hollow cylindrical portion 161 and extends curvedly from the hollow cylindrical portion 161 toward the inner peripheral surface 43 of the lower annular plate portion 31. The hollow cylindrical portion 161 and the lower annular portion 163 form a curved surface 166 in cooperation with each other. The curved surface 166 defines the central hole 91 at the lower portion of the lower casing 5. The inner peripheral-side annular fitting portion 134 is inserted into the respective through holes 154 and is thereby fitted to the inner peripheral-side annular projection 133 in such a manner as to cover that inner peripheral-side annular projection 133.

The inner peripheral-side thin-walled annular projecting edge portion 137 has a hollow cylindrical portion 168 formed integrally with the upper annular portion 162 as well as an annular projecting edge portion 169 formed integrally at an upper end of the hollow cylindrical portion 168. Although the annular projecting edge portion 169 extends horizontally toward the thin-walled portion 121 in, for example, FIGS. 10 and 12, the annular projecting edge portion 169 may, for example, be inclined so as to be gradually removed away from the upper annular plate portion 11 as the annular projecting edge portion 169 approaches the thin-walled portion 121. The inside diameter of the annular projecting edge portion 169 is smaller than or equal to a minimum diameter of an outer peripheral surface 115 of the thin-walled portion 121. Such an inner peripheral-side thin-walled annular projecting edge portion 137 is in slidable contact with the outer peripheral surface 115. The outer peripheral surface 115 of the thin-walled portion 121 may have a portion which is gradually reduced in diameter with increasing distance from the upper annular plate portion 11.

As shown in FIGS. 17 to 23, the sliding bearing 1 in accordance with this embodiment may have, instead of the seal means 138, a seal means 238 disposed on the inner peripheral side of the annular space 36. In such a sliding bearing 1, the upper casing 3 has, instead of the upper inner cylindrical portion 21, an upper inner cylindrical portion 221 which is formed integrally with the inner peripheral side of the upper annular plate portion 11 and extends downward toward the lower casing 5, and the lower casing 5 has a hollow cylindrical lower inner cylindrical portion 171 which is formed integrally with the inner peripheral side of the lower annular plate portion 31 and extends downward, as well as an inner peripheral-side annular projection 233 serving as an annular projection which is formed integrally with the lower inner peripheral side of the lower inner cylindrical portion 171. Such a sliding bearing 1 may have a hollow cylindrical radial sliding bearing piece 172 disposed in a space between the lower inner cylindrical portion 171 and the upper inner cylindrical portion 221.

Figure 17:
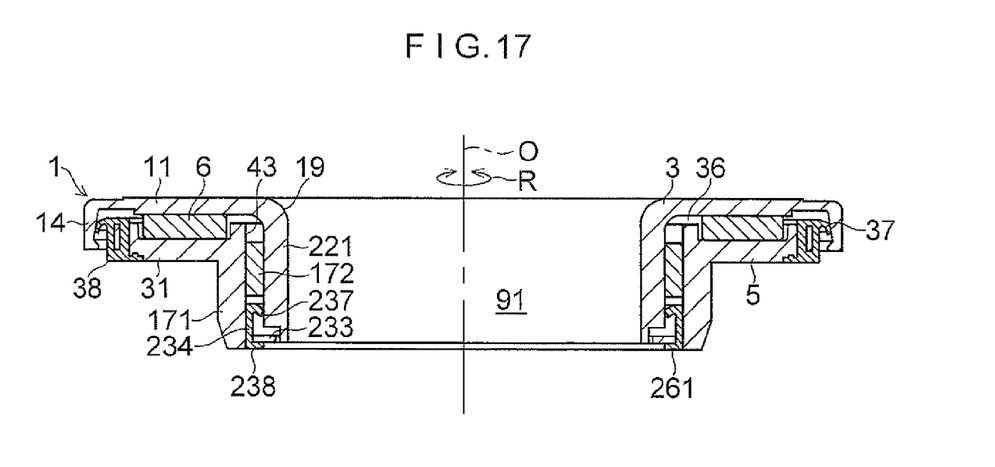
FIG. 17 is an explanatory cross-sectional view of still another embodiment of the invention.
Figure 18:
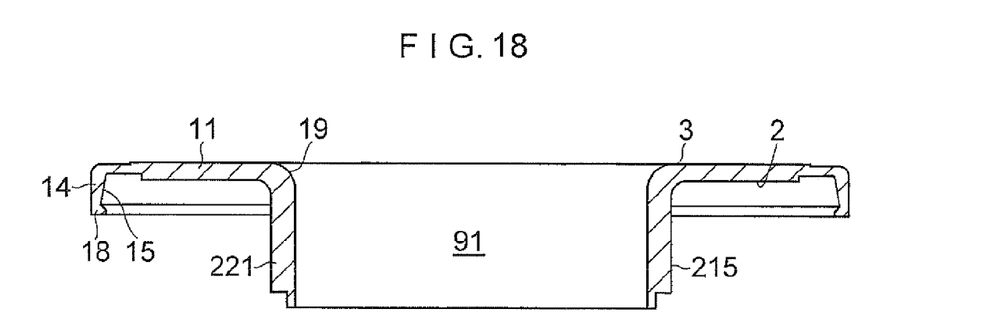
FIG. 18 is an explanatory cross-sectional view of mainly the upper casing of the embodiment shown in FIG. 17.
Figure 19:
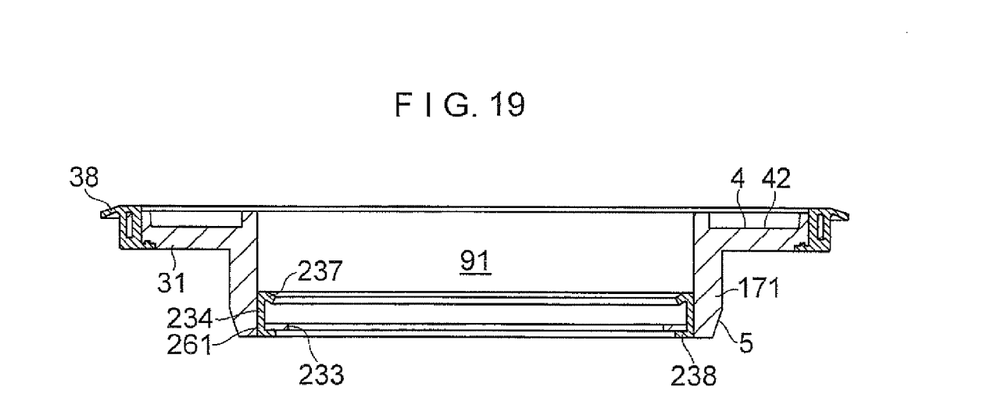
FIG. 19 is an explanatory cross-sectional view of mainly the lower casing of the embodiment shown in FIG. 17.
Figure 20:
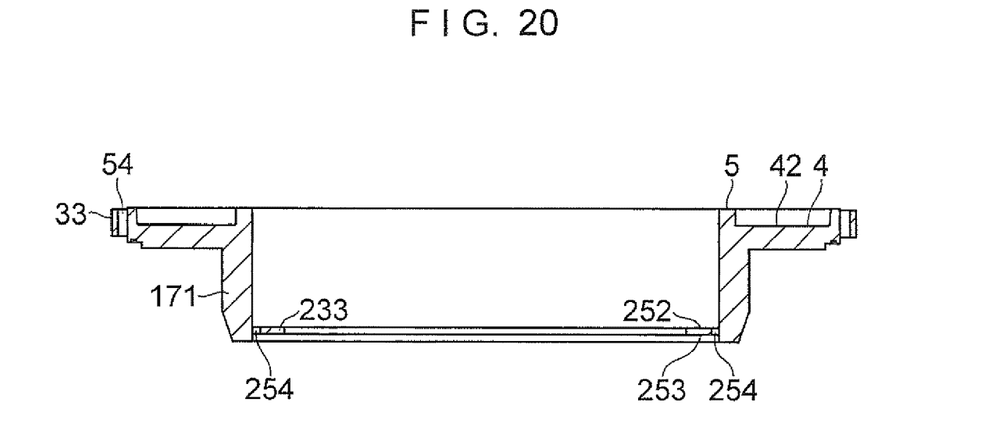
FIG. 20 is a fragmentary explanatory cross-sectional view of mainly the lower casing of the embodiment shown in FIG. 17.
Figure 21:
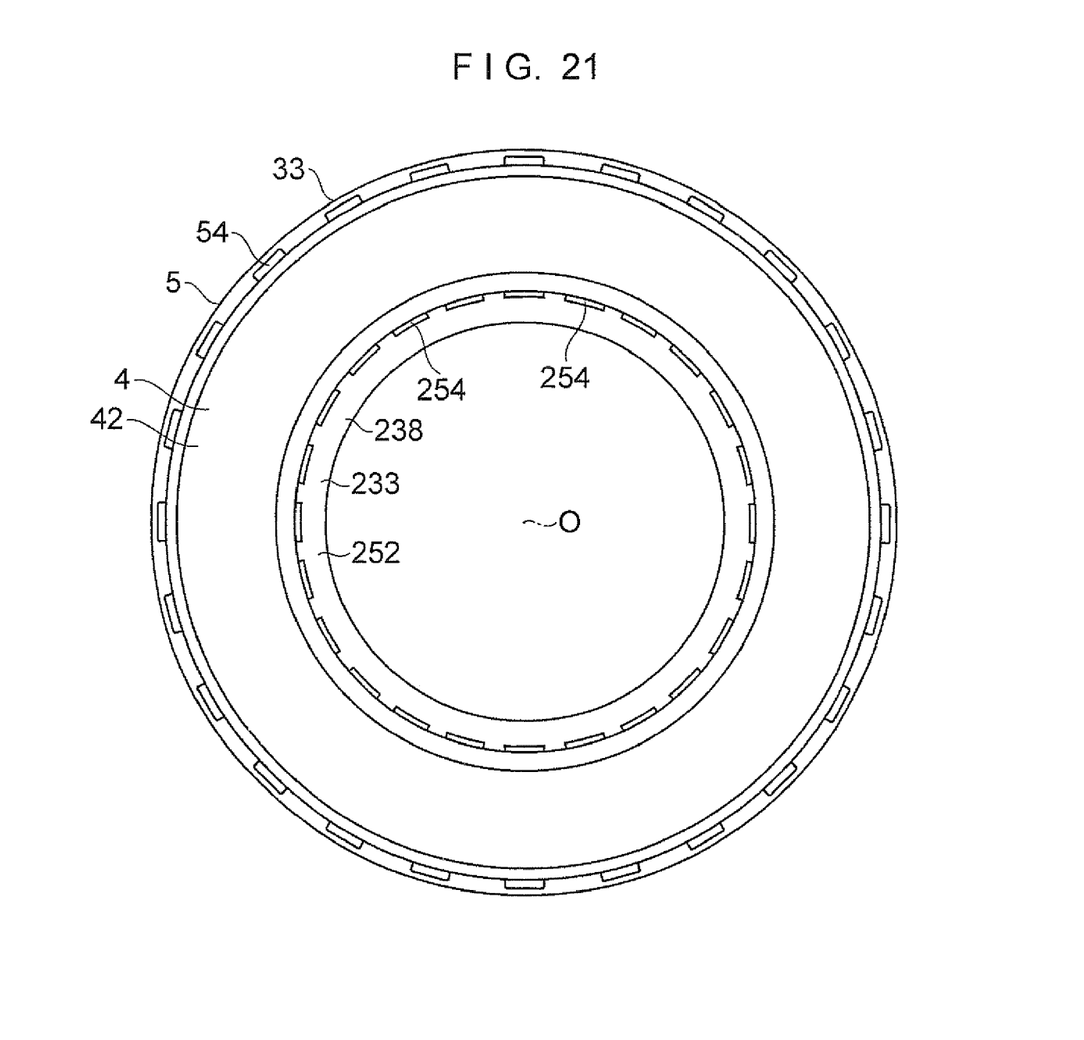
FIG. 21 is a fragmentary explanatory plan view of mainly the lower casing of the embodiment shown in FIG. 17.
Figure 22:
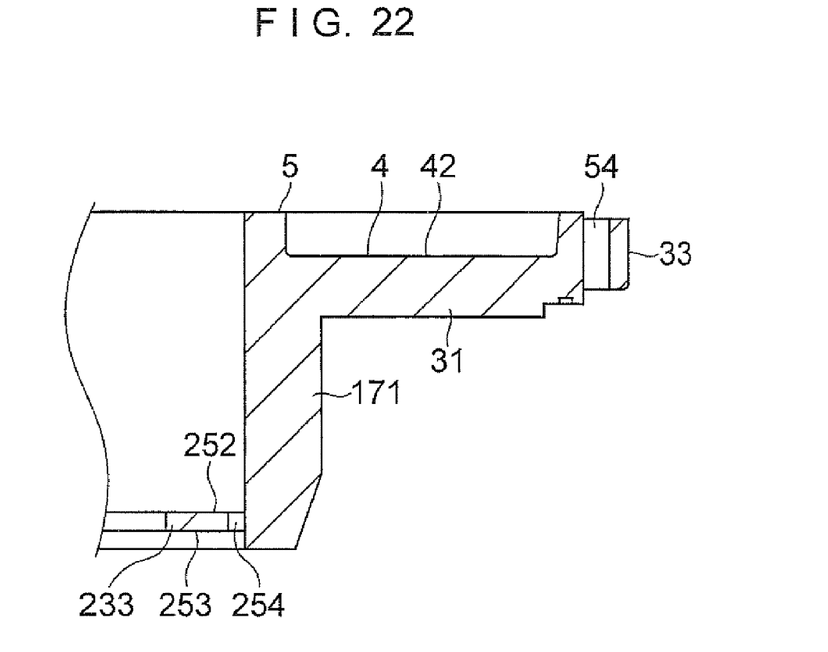
FIG. 22 is a partly enlarged explanatory diagram of mainly the lower casing of the embodiment shown in FIG. 17.
Figure 23:
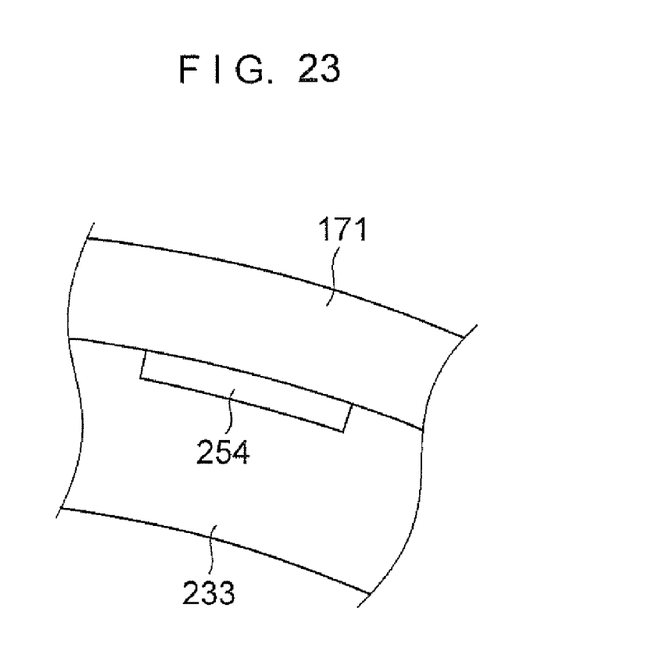
FIG. 23 is a partly enlarged explanatory diagram of mainly the lower casing of the embodiment shown in FIG. 17.

The seal means 238 includes a plurality of through holes 254 formed on an inner peripheral side of the lower casing 5; an inner peripheral-side annular fitting portion 234 serving as an annular fitting portion which is inserted into the plurality of through holes 254 so as to be fitted to the lower casing 5; and an inner peripheral-side thin-walled annular projecting edge portion 237 serving as a flexible thin-walled annular projecting edge portion which is formed integrally with the inner peripheral-side annular fitting portion 234, and is brought into sliding contact with the upper casing 3 so as to seal the inner peripheral side of the annular space 36.

The plurality of through holes 254 are formed in the inner peripheral-side annular projection 233. Each of the through holes 254 extends from an upper surface 252 to a lower surface 253 of the inner peripheral-side annular projection 233.

The inner peripheral-side annular fitting portion 234 has a cross-sectionally L-shaped portion 261 which is inserted into the respective through holes 254 so as to be secured to the lower casing 5. The inner peripheral-side thin-walled annular projecting edge portion 237 is formed integrally with an upper end of the cross-sectionally L-shaped portion 261.

According to the sliding bearing 1 of this embodiment, the sliding bearing 1 is comprised of the upper casing 3 having the annular lower surface 2; the lower casing 5 which is superposed on the upper casing 3 so as to be rotatable about the axis O of the upper casing 3, and has the annular upper surface 4 opposed to the annular lower surface 2 of the upper casing 3; the annular thrust sliding bearing piece 6 disposed in the annular space 36 between the annular lower surface 2 and the annular upper surface 4; and the seal means 38 and/or 138 or 238 disposed on at least one of the outer peripheral side and the inner peripheral side of the annular space 36. The seal means 38 and/or 138 or 238 includes the plurality of through holes 54 and/or 154 or 254 formed in at least one of the outer peripheral side and the inner peripheral side of the lower casing 5; the outer peripheral-side annular fitting portion 34 and/or the inner peripheral-side annular fitting portion 134 or 234 serving as the annular fitting portion which is inserted into the plurality of through holes 54 and/or 154 or 254 so as to be fitted to the lower casing 5; and the outer peripheral-side thin-walled annular projecting edge portion 37 and/or the inner peripheral-side thin-walled annular projecting edge portion 137 or 237 serving as a flexible thin-walled annular projecting edge portion which is formed on the outer peripheral-side annular fitting portion 34 and/or the inner peripheral-side annular fitting portion 134 or 234, and is brought into sliding contact with the upper casing 3 so as to seal at least one of the outer peripheral side and the inner peripheral side of the annular space 36. Therefore, it is possible to eliminate the possibility of separation of the outer peripheral-side annular fitting portion 34 and/or the inner peripheral-side annular fitting portion 134 or 234 from the lower casing 5. Further, it is possible to prevent the occurrence of rotation of the outer peripheral-side annular fitting portion 34 and/or the inner peripheral-side annular fitting portion 134 or 234 with respect to the lower casing 5. Furthermore, it is possible to reduce a contacting region of the seal means 38 and/or 138 or 238 with respect to the upper casing 3. Hence, it is possible to exhibit high sealability due to the sliding contact of the flexible outer peripheral-side thin-walled annular projecting edge portion 37 and/or inner peripheral-side thin-walled annular projecting edge portion 137 or 237 with respect to the upper casing 3. Additionally, it is possible to attain the maintenance of such high sealability over extended periods of time and reduction of unpleasant noise. In particular, since the outer peripheral-side annular fitting portion 34 and/or the inner peripheral-side annular fitting portion 134 or 234 is inserted into the plurality of through holes 54 and/or 154 or 254 so as to be fitted to the lower casing 5, it is possible to eliminate the twisting of the outer peripheral-side annular fitting portion 34 and/or the inner peripheral-side annular fitting portion 134 or 234 as well as the outer peripheral-side thin-walled annular projecting edge portion 37 and/or the inner peripheral-side thin-walled annular projecting edge portion 137 or 237, which can occur in the relative rotation between the upper casing 3 and the lower casing 5. Hence, it is possible to prevent with higher sealability the entry of dust, rainwater, muddy water, or the like into the annular space 36 through the portion between, on the one hand, the outer peripheral-side annular fitting portion 34 and/or the inner peripheral-side annular fitting portion 134 or 234 and, on the other hand, the lower casing 5.

According to the sliding bearing 1, the lower casing 5 includes the lower annular plate portion 31 having the aforementioned annular upper surface 4, as well as the outer peripheral-side annular projection 33 and/or the inner peripheral-side annular projection 133 or 233 which is formed integrally with at least one of the outer peripheral surface 32 and the inner peripheral surface 43 of the lower annular plate portion 31, and which is thinner-walled than that lower annular plate portion 31. The plurality of through holes 54 and/or 154 or 254 are formed in the outer peripheral-side annular projection 33 and/or the inner peripheral-side annular projection 133 or 233. The outer peripheral-side annular fitting portion 34 and/or the inner peripheral-side annular fitting portion 134 or 234 is inserted into the plurality of through holes 54 and/or 154 or 254 so as to cover the outer peripheral-side annular projection 33 and/or the inner peripheral-side annular projection 133 or 233. According to such a preferred embodiment, the outer peripheral-side annular fitting portion 34 and/or the inner peripheral-side annular fitting portion 134 or 234 can be fitted to the lower casing 5 more reliably.

According to the sliding bearing 1, in the case where there is provided the seal means 38 disposed on the outer peripheral side of the annular space 36, the upper casing 3 includes the upper annular plate portion 11 having the aforementioned annular lower surface 2, as well as the upper outer cylindrical portion 14 formed on the outer peripheral surface 12 side of the upper annular plate portion 11, and the outer peripheral-side thin-walled annular projecting edge portion 37 of that seal means 38 is inclined in such a manner as to be gradually removed away from the upper annular plate portion 11 as the outer peripheral-side thin-walled annular projecting edge portion 37 approaches the upper outer cylindrical portion 14. Therefore, high sealability can be exhibited, and the maintenance of high sealability over extended periods of time due to the seal means 38 can also be attained.

According to the sliding bearing 1, the inner peripheral surface 15 of the upper outer cylindrical portion 14 has the portion 17 which is gradually enlarged in diameter with increasing distance from the upper annular plate portion 11, and the outside diameter of the outer peripheral-side thin-walled annular projecting edge portion 37 of that seal means 38 disposed on the outer peripheral side of the annular space 36 is larger than or equal to the maximum diameter of the inner peripheral surface 15 of the upper outer cylindrical portion 14. Therefore, it is possible to eliminate the possibility of the outer peripheral-side thin-walled annular projecting edge portion 37 being removed away from the upper outer cylindrical portion 14, thereby allowing high sealability to be exhibited.

According to the sliding bearing 1, in the case where there is provided the seal means 138 or 238 disposed on the inner peripheral side of the annular space, the upper casing 3 includes the upper annular plate portion 11 having the aforementioned annular lower surface 2, as well as the upper inner cylindrical portion 21 having the thin-walled portion 121 or the upper inner cylindrical portion 221 formed on the inner peripheral surface 19 side of the upper annular plate portion 11. Further, the inner peripheral-side thin-walled annular projecting edge portion 137 or 237 of that seal means 138 or 238 may be inclined in such a manner as to be gradually removed away from the upper annular plate portion 11 as the inner peripheral-side thin-walled annular projecting edge portion 137 or 237 approaches the upper inner cylindrical portion 21 or 221. Therefore, high sealability can be exhibited, and the maintenance of high sealability over extended periods of time can also be attained.

According to the sliding bearing 1 the outer peripheral surface 115 of the thin-walled portion 121 of the upper inner cylindrical portion 21 or an outer peripheral surface 215 of the upper inner cylindrical portion 221 may have a portion which is gradually reduced in diameter with increasing distance from the upper annular plate portion 11. Further, the inside diameter of the inner peripheral-side thin-walled annular projecting edge portion 137 or 237 of the seal means 138 or 238 disposed on the inner peripheral side of the annular space 36 may be smaller than or equal to the minimum diameter of the outer peripheral surface 115 or 215. Therefore, it is possible to eliminate the possibility of the inner peripheral-side thin-walled annular projecting edge portion 137 or 237 being removed away from the upper inner cylindrical portion 21 or 221, thereby allowing high sealability to be exhibited.

The invention claimed is:
1. A sliding bearing comprising:
an upper casing having an annular lower surface;
a lower casing which is superposed on said upper casing so as to be rotatable about an axis of said upper casing and has an annular upper surface opposed to the annular lower surface of said upper casing;
an annular thrust sliding bearing piece disposed in an annular space between the annular lower surface and the annular upper surface; and seal means disposed on at least one of an outer peripheral side and an inner peripheral side of the annular space, wherein said seal means includes a plurality of through holes formed in at least one of an outer peripheral side and an inner peripheral side of said lower casing, an annular fitting portion which is inserted into the plurality of through holes so as to be fitted to said lower casing, and a flexible thin-walled annular projecting edge portion which is formed on the annular fitting portion and is brought into sliding contact with said upper casing so as to seal at least one of the outer peripheral side and the inner peripheral side of the annular space.

2. The sliding bearing according to claim 1, wherein said lower casing includes a lower annular plate portion having the annular upper surface and an annular projection which is formed integrally with at least one of an outer peripheral surface and an inner peripheral surface of the lower annular plate portion, and which is thinner-walled than the lower annular plate portion, the plurality of through holes being formed in the annular projection, the annular fitting portion being inserted into the plurality of through holes to cover the annular projection.

3. The sliding bearing according to claim 2, wherein the annular fitting portion includes a hollow cylindrical portion; an upper annular portion and a lower annular portion formed integrally with the hollow cylindrical portion; and a plurality of connecting portions which are respectively inserted into the plurality of through holes so as to connect the upper annular portion and the lower annular portion.

4. The sliding bearing according to claim 1, wherein the annular fitting portion has a cross-sectionally L-shaped portion which is inserted into the plurality of through holes so as to be secured to said lower casing.

5. The sliding bearing according to claims 1, wherein in a case where there is provided said seal means disposed on the outer peripheral side of the annular space, said upper casing includes an upper annular plate portion having the annular lower surface and an upper outer cylindrical portion formed on an outer peripheral surface side of the upper annular plate portion, and the thin-walled annular projecting edge portion of said seal means is inclined in such a manner as to be gradually removed away from the upper annular plate portion as the thin-walled annular projecting edge portion approaches the upper outer cylindrical portion.

6. The sliding bearing according to claim 5, wherein an inner peripheral surface of the upper outer cylindrical portion has a portion which is gradually enlarged in diameter with increasing distance from the upper annular plate portion, and an outside diameter of the thin-walled annular projecting edge portion of said seal means disposed on the outer peripheral side of the annular space is larger than or equal to a maximum diameter of the inner peripheral surface of the upper outer cylindrical portion.

7. The sliding bearing according to claim 1, wherein in a case where there is provided said seal means disposed on the inner peripheral side of the annular space, said upper casing includes an upper annular plate portion having the annular lower surface and an upper inner cylindrical portion formed on an inner peripheral surface side of the upper annular plate portion, and the thin-walled annular projecting edge portion of said seal means is inclined in such a manner as to be gradually removed away from the upper annular plate portion as the thin-walled annular projecting edge portion approaches the upper inner cylindrical portion.

8. The sliding bearing according to claim 7, wherein an outer peripheral surface of the upper inner cylindrical portion has a portion which is gradually reduced in diameter with increasing distance from the upper annular plate portion, and an inside diameter of the thin-walled annular projecting edge portion of said seal means disposed on the inner peripheral side of the annular space is smaller than or equal to a minimum diameter of the outer peripheral surface of the upper inner cylindrical portion.

9. The sliding bearing according to claim 1, wherein the thin-walled annular projecting edge portion is formed of a thermoplastic elastomer.

10. The sliding bearing according to claim 1, wherein at least one of said upper casing and said lower casing is formed of a synthetic resin, and the synthetic resin for forming at least one of said upper casing and said lower casing includes at least one of polyacetal resin, polyamide resin, polyester resin, polyolefin resin, polycarbonate resin, and fluororesin.

11. The sliding bearing according to claim 1, wherein said thrust sliding bearing piece is formed of a synthetic resin, and the synthetic resin for forming said thrust sliding bearing piece includes at least one of polyacetal resin, polyamide resin, polyester resin, polyolefin resin, polycarbonate resin, and fluororesin.

* * * * *